W. OELENSCHLAGER AND V. B. ARKLESS.
SAFETY GATE FOR RAILROAD CROSSINGS.
APPLICATION FILED APR. 26, 1920.
1,382,534.
Patented June 21, 1921.
2 SHEETS—SHEET 1.
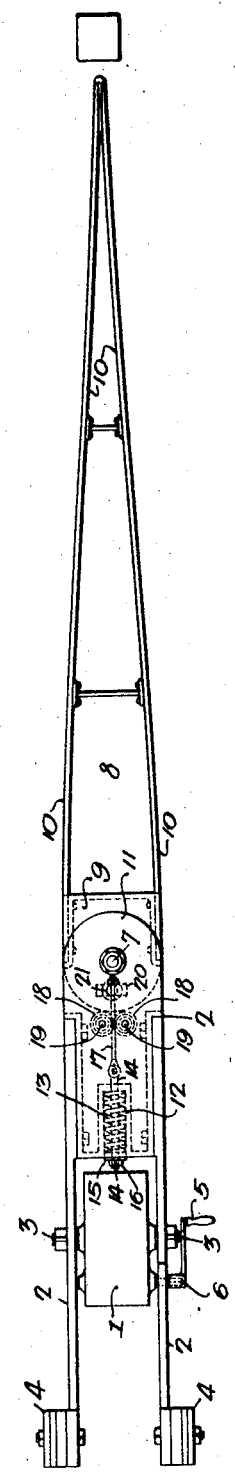
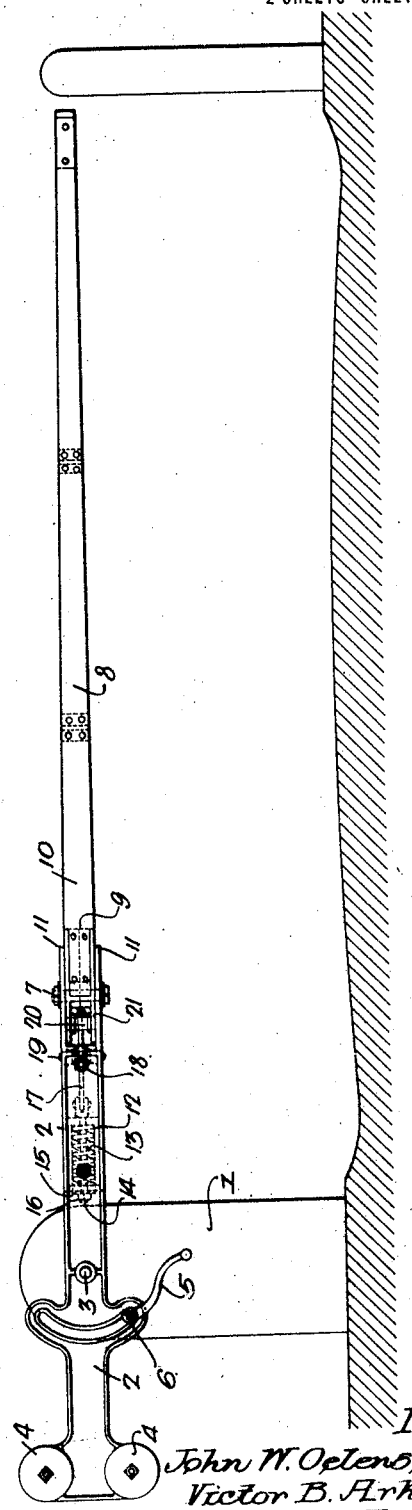
Inventor
John W. Oelenschlager
Victor B. Arkless.
by their Attorneys
Howson & Howson

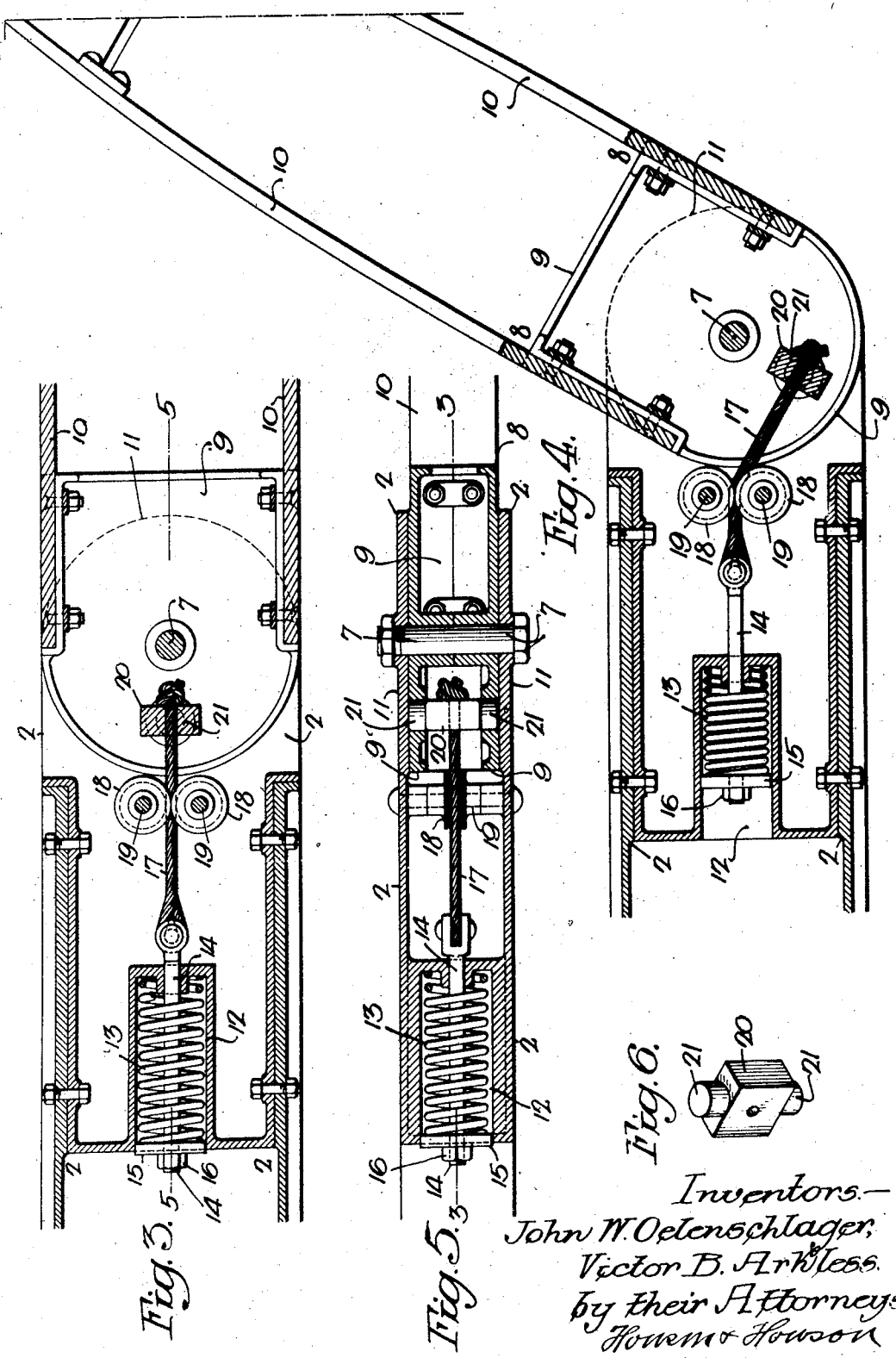

UNITED STATES PATENT OFFICE.

JOHN W. OELENSCHLAGER AND VICTOR B. ARKLESS, OF NORRISTOWN, PENNSYLVANIA.

SAFETY-GATE FOR RAILROAD-CROSSINGS.

1,382,534.　　　　Specification of Letters Patent.　　Patented June 21, 1921.

Application filed April 26, 1920. Serial No. 376,657.

*To all whom it may concern:*

Be it known that we, JOHN W. OELENSCHLAGER and VICTOR B. ARKLESS, citizens of the United States, residing in Norristown, Pennsylvania, have invented certain Improvements in Safety-Gates for Railroad-Crossings, of which the following is a specification.

One object of our invention is to construct a safety gate for railway crossings which will close the roadway but will allow for the passage of a vehicle through the gate in the event of the vehicle not stopping before reaching the gate.

A further object of the invention is to provide a yielding section which after a vehicle has passed will swing back to its original position.

In the accompanying drawings:—

Figure 1 is a plan view of our improved safety gate;

Fig. 2 is a side view;

Fig. 3 is an enlarged sectional plan view, illustrating the details of the construction, section being on the line 3—3, Fig. 5;

Fig. 4 is a view similar to Fig. 3 showing the pivoted section turned at an angle to the body part of the gate; and Fig. 5 is a sectional view on the line 5—5, Fig. 3.

1 is the standard of the ordinary construction located at one side of a roadway and at one side of the railway. 2 is the body part of the gate pivoted to the standard at 3; and 4 is a balance weight used to allow the gate to be turned freely by the handle 5 which is attached to a shaft 6 connected to gearing within the standard, so that on turning the handle the gate can be raised to a vertical position or lowered to a horizontal position as shown in Fig. 2.

Pivoted to the body 2 of the gate at 7 is a yielding section 8 consisting of a hub portion 9 and side members 10 which are connected together at intervals and resemble the ordinary form of gate, which is made comparatively light. The hub section in the present instance is made in two parts, and is mounted on a pivot pin 7 between the upper and lower members 11 of the body portion 2.

In the present instance integral with the body portion 2 is a chamber 12 in which is located a coiled spring 13. Extending through this spring is a rod 14 having at its rear end an enlarged washer 15 held in place by a nut 16 adjustable on a rod. The rod extends through a bearing in the forward end of the chamber and is attached to a rope 17 in the present instance which passes between two grooved guide rollers 18 mounted on vertical pivots 19, and is attached to a swivel block 20 of the type shown in Fig. 6 having trunnions 21 mounted in bearings in a hub 9. The spring 13 tends to hold the pivoted section 8 normally in line with the body portion 2 of the gate so that in all appearances it is similar to the ordinary gate now in common use at railway crossings, but if for any reason a vehicle cannot be stopped at the gate until it strikes the gate, then the pivoted section will yield until the vehicle comes to a full stop. This action prevents the breaking of the gate which very often occurs, due to the ineffective brakes on vehicles, or the inability to stop a team in time. As soon as the vehicle is backed off, the pivoted section will be returned to its normal position. The spring 13 can be adjusted by turning the nut 16 on the rod 14 so as to increase or decrease the tension of the spring, and by swiveling the block 20 as shown, it will accommodate itself to the rope, preventing the cutting of the rope at the block.

We claim:

1. The combination in a safety gate for railway crossings of a standard; a body portion of a gate pivoted to the standard; means for operating the gate; a vertical pivot pin on the body portion; a pivoted section consisting of a hub and extensions mounted on the pivot pin; a centrally located spring on the body portion; a rod extending through the spring and having a head bearing against the spring; a rope attached to the rod and connected to the hub; and guides for the rope, said spring tending to hold the pivoted section yieldingly in line with the body portion of the gate so that it will yield in either direction under pressure.

2. The combination in a safety gate for railway crossings of a standard; a body portion of the gate pivoted to the standard; means for operating the gate; a hub pivotally mounted on the body portion and having extensions forming with the hub a yielding section; a spring mounted in the body portion; a rod extending through the spring and having a washer bearing against one end of the spring; means for adjusting the washer; a rope attached to the rod; a swivel block mounted on the hub and to which the rope is connected; two guide rollers, one on each side of the rope mounted on the body portion so that when the yielding section is turned on its pivot, the spring will be compressed and the rope will bear against one of the rollers, and the block will accommodate itself to the rope.

JOHN W. OELENSCHLAGER.
VICTOR B. ARKLESS.